(12) United States Patent
Okamoto et al.

(10) Patent No.: US 9,500,823 B2
(45) Date of Patent: Nov. 22, 2016

(54) OPTO-ELECTRIC INTEGRATED CIRCUIT AND OPTICAL INTERPOSER

(71) Applicants: NEC Corporation, Tokyo (JP); FUJITSU LIMITED, Kanagawa (JP)

(72) Inventors: Daisuke Okamoto, Tokyo (JP); Yutaka Urino, Tokyo (JP); Tatsuya Usuki, Kanagawa (JP)

(73) Assignees: NEC CORPORATION, Tokyo (JP); FUJITSU LIMITED, Kanagawa (JP)

( * ) Notice: Subject to any disclaimer, the term of this patent is extended or adjusted under 35 U.S.C. 154(b) by 0 days.

(21) Appl. No.: 14/666,630

(22) Filed: Mar. 24, 2015

(65) Prior Publication Data

US 2015/0277069 A1   Oct. 1, 2015

(30) Foreign Application Priority Data

Mar. 25, 2014  (JP) .................................. 2014-062673

(51) Int. Cl.
  *G02B 6/12*  (2006.01)
  *G02B 6/42*  (2006.01)
  *G02B 6/43*  (2006.01)

(52) U.S. Cl.
  CPC ............... *G02B 6/4274* (2013.01); *G02B 6/43* (2013.01); *G02B 6/4268* (2013.01)

(58) Field of Classification Search
  None
  See application file for complete search history.

(56) References Cited

U.S. PATENT DOCUMENTS

| | | | | |
|---|---|---|---|---|
| 4,691,214 A | * | 9/1987 | Hayakawa | .............. H01L 27/15 257/84 |
| 7,112,827 B2 | * | 9/2006 | Hayakawa | ............ H01S 5/0607 257/116 |
| 7,373,034 B2 | | 5/2008 | Shimizu et al. | |
| 8,450,836 B2 | | 5/2013 | Uemura et al. | |
| 8,587,121 B2 | | 11/2013 | Koester et al. | |
| 8,634,443 B2 | * | 1/2014 | Igarashi | .................... H01S 5/22 372/45.01 |
| 8,995,493 B2 | * | 3/2015 | Joseph | .................... H01S 5/183 372/50.12 |
| 9,122,003 B2 | * | 9/2015 | Onishi | ...................... G02B 6/12 |
| 2007/0263957 A1 | | 11/2007 | Shimizu et al. | |
| 2011/0233785 A1 | | 9/2011 | Koester et al. | |
| 2011/0266646 A1 | | 11/2011 | Uemura et al. | |

FOREIGN PATENT DOCUMENTS

| | | |
|---|---|---|
| JP | 61-40081 | 2/1986 |
| JP | 2013-522929 | 6/2013 |
| WO | 2006025523 | 3/2006 |
| WO | 2010004850 | 1/2010 |
| WO | 2011086612 | 7/2011 |

* cited by examiner

*Primary Examiner* — Sung Pak
(74) *Attorney, Agent, or Firm* — Young & Thompson

(57) ABSTRACT

An opto-electric integrated circuit includes an optical waveguide formed using a portion of an insulation layer on a silicon substrate to form a lower clad and using a portion of a semiconductor layer formed on the insulation layer to form a core. The opto-electric integrated circuit also includes an optical device connected to the optical waveguide, an electrical circuit connected to the optical device, a mesa-shaped connection section interconnecting the optical device and the electrical circuit, and an electrically conductive film formed in a region at least containing a flank surface of the connection section. The electrically conductive film is grounded while contacting the silicon substrate.

10 Claims, 8 Drawing Sheets

OPTO-ELECTRIC INTEGRATED CIRCUIT AND OPTICAL INTERPOSER

TECHNICAL FIELD

Reference to Related Application

The present invention is based upon and claims the benefit of the priority of Japanese patent application No. 2014-062673, filed on Mar. 25, 2014, the disclosure of which is incorporated herein in its entirety by reference thereto.

This invention relates to an opto-electric integrated circuit and an optical interposer.

BACKGROUND

As the communication technique becomes more popular, the volume of data (information volume) tackled by information processing apparatus, such as servers or routers, is increasing rapidly. On the other hand, the communication capacity required for transmitting signals among semiconductor devices including LSIs (Large Scale Integrated Circuits) composing the information processing apparatus is estimated to increase acutely in time to come.

Under these situations, a diversity of problems inherent in the electrical interconnection techniques used in communication employing electrical signals has come to the surface. These problems include increasing power consumption, increasing delay in signal transmission, deteriorated reliability in signal lines and interferences among electrical signals. To combat these situations, the use of optical interconnections to cope with variable distances for transmission ranging from long-distance transmission as in optical communication systems interconnecting base units down to the short-distance transmission within or among semiconductor devices or chips is being investigated carefully.

In Patent Literature 1, there is disclosed a semiconductor device in which field-effect transistors (FETs) and a semiconductor laser device are integrated on the front and back sides of one and the same substrate. In Patent Literatures 2, 3, there is shown an opto-electric complex module or an optical interconnection structure in which a light receiving element or a light receiver is surrounded by electrically conductive vias to interrupt stray light or electromagnetic noise to diminish the optical or electrical crosstalk.

In Patent literature 4, there is disclosed a structure in which a through-substrate via is formed in a region between a digital circuit and an analog circuit formed on a surface of a semiconductor substrate to suppress the electrical crosstalk.

In Patent Literature 5, a dummy plug formed of an electrically conductive material is embedded in an inner portion of a substrate to diminish the electrical crosstalk as well as to enhance thermal conductivity in a vertical direction.

[Patent Literature 1]
JP patent Kokai Publication No. JP-S61-040081A (FIG. 1)
[Patent Literature 2]
WO 2006/025523A1 (FIG. 1)
[Patent Literature 3]
WO 2010/004850A1 (FIG. 1)
[Patent Literature 4]
WO 2011/086612A1 (FIG. 1)
[Patent Literature 5]
JP patent Kohyo Publication No. JP2013-522929A (FIG. 2)

SUMMARY

The disclosures of the above listed prior art technical literatures are to be incorporated by reference into the present Application. The following analysis is by the present inventors.

In information processing systems or in optical communication systems, in which signal transmission is made using an optical interconnection, a high-performance opto-electric integrated circuit is frequently used. For such opto-electric integrated circuit, it is necessary to use not only optical devices, such as modulators or light receivers, but also electrical circuits, such as a driver circuit driving the modulator or a TIA (Transimpedance Amplifier) circuit that amplifies light receiver signals.

Since the optical devices and the electrical circuits co-exist in the opto-electric integrated circuit, it is necessary to decrease both the electrical crosstalk and the optical crosstalk. In particular, in the opto-electric integrated circuit, configured to deal with multiple channels, adverse effects of the electrical crosstalk and those of the optical crosstalk become more pronounced because of the increased number of transmitted/received signals.

Moreover, the operation of the electrical circuits, such as the driver or the TIA circuits, or the optical devices, generates heat. If this heat cannot be removed sufficiently, the opto-electric integrated circuit tends to fall into disorder due to temperature variations. For example, in light receivers, dark current increases with rise in ambient temperature. Hence, rise in temperature tends to produce deteriorated reception sensitivity of the light receivers. In modulators, the optimum bias point in the modulation operation tends to be shifted with variations in temperature, thus possibly leading to malfunctions.

The electrical circuits as well as the optical devices (light receivers or modulators) are liable to be deteriorated in characteristics due to temperature variations. In particular, if the opto-electric integrated circuit is formed on a SOI (Silicon-On-Insulator) substrate, temperature variations are more outstanding because of the high thermal resistance of a buried oxide layer (insulation film).

In Patent literature 1, no mention is made of the optical crosstalk or the electrical crosstalk. In Patent Literatures 2, 3, the structure that reduces the optical and electrical crosstalk is disclosed, however, there is no reference made therein to the heat removal in the opto-electric integrated circuits. In Patent Literature 4, showing the structure of suppressing electrical crosstalk by through-substrate vias, there is no mention of the heat removal efficiency of the opto-electric integrated circuit. As long as the information available at the present inventors is concerned, the through-substrate vias are thought to be insufficient to obtain sufficiently high values of the heat removing efficiency.

In Patent Literature 5, there is disclosed such a structure in which a dummy plug embedded in a substrate is formed of an electrically conductive material to reduce electrical crosstalk as well as to raise thermal conductivity in a vertical direction. Although heat conduction may take place in the substrate by the dummy plug, only the dummy plug portion is taking charge of heat removal, so that no sufficient heat removal efficiency may possibly be assured. If, in particular, the insulation film, having a high thermal resistance, is present within the opto-electric integrated circuit, the problem of the poor heat removing efficiency is more apparent.

In addition, in the technique disclosed in Patent Literature 5, the dummy plug needs to be formed for extending through both the semiconductor layer and the insulation layer, thus complicating the manufacturing process.

It is an object of the present invention to provide an opto-electric integrated circuit and an optical interposer that will contribute to reducing the optical crosstalk and the electrical crosstalk and to improving the heat removing efficiency.

In a first aspect of the present invention, there is provided an opto-electric integrated circuit comprising an optical waveguide formed using a portion of an insulation layer on a silicon substrate to form a lower clad and using a portion of a semiconductor layer formed on the insulation layer to form a core, an optical device connected to the optical waveguide, an electrical circuit connected to the optical device, a mesa-shaped connection section interconnecting the optical device and the electrical circuit, and an electrically conductive film formed in a region at least containing a flank surface of the connection section. The electrically conductive film is grounded while contacting the silicon substrate.

In a second aspect of the present invention, there is provided an optical interposer comprising a silicon substrate on which there is formed the opto-electric integrated circuit described above and a plurality of semiconductor chips formed on the silicon substrate. With the optical interposer, an optical signal is transmitted among the semiconductor chips.

The meritorious effects of the present invention are summarized as follows. In the aspects of the present invention, there may be provided an opto-electric integrated circuit and an optical interposer in which the optical crosstalk as well as the electrical crosstalk may be reduced to improve the heat removing efficiency.

PREFERRED MODES

Initially, a summary of a preferred mode of the present invention will be described with reference to FIGS. 1A and 1B. It is noted that symbols are entered in the summary merely as examples to assist in understanding and are not intended to limit the present invention to the mode illustrated.

Such an opto-electric integrated circuit in which the optical crosstalk as well as the electrical crosstalk is diminished to enhance the heat-removing efficiency is desirable, as stated above.

Figure 1A:
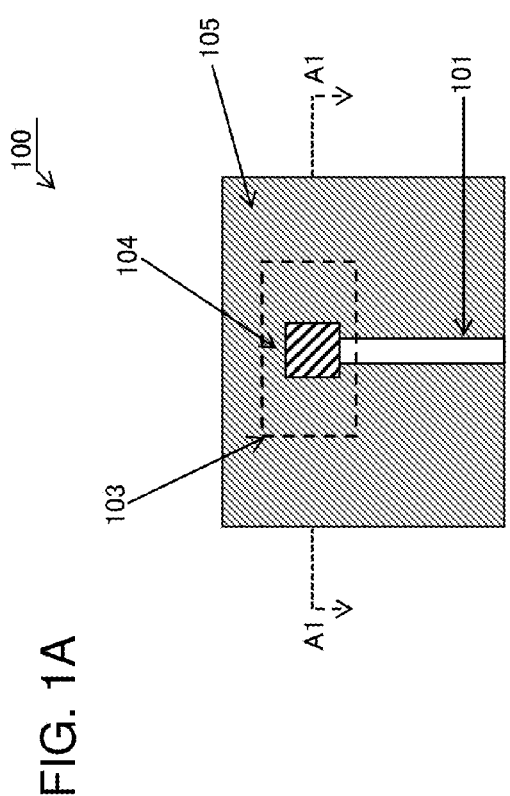
FIGS. 1A and 1B are example schematic views for illustrating the global structure of an exemplary embodiment.
Figure 1B:
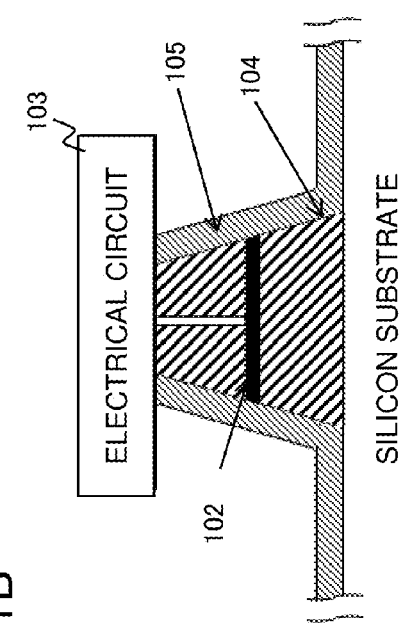

With this in view, an opto-electric integrated circuit 100, shown as an example in FIGS. 1A and 1B, is provided. The opto-electric integrated circuit 100 includes an optical waveguide 101, an optical device 102, an electric circuit 103, a connection section 104 and an electrically conductive film 105.

Referring to FIG. 1A, showing a plan view of the opto-electric integrated circuit 100, and to FIG. 1B, showing a schematic cross-sectional view taken along line A1-A1 of FIG. 1A, the optical waveguide 101 is formed using a portion of an insulation layer on a silicon substrate as a lower clad and using a portion of a semiconductor layer on the insulation layer as a core. The optical device 102 is connected to the optical waveguide 101 and the electric circuit 103 is connected to the optical device 102. The connection section 104, interconnecting the optical device 102 and the electric circuit 103, has a mesa-shaped cross-section. The electrically conductive film 105 is formed in a region at least including a flank surface of the mesa-shaped connection section 104, and is contacted with a silicon substrate as it is electrically grounded. By the way, the electric circuit 103 is shown with a broken line in FIG. 1A for ease in understanding.

The opto-electric integrated circuit 100 includes an integrated optical waveguide 101 so as to allow a complicated opto-electric integrated circuit structure to be formed as a planar structure. The opto-electric integrated 100 is so configured that an insulation layer operating as a lower clad of the optical waveguide 101 is machined to form a mesa-shaped connection section 104 and the electrically conductive film 105 is formed therearound. The electrically conductive film 105, surrounding the optical device 102 formed in an inner portion of the connection section 104, shields stray light coming from other optical devices, thus reducing the optical crosstalk. On the other hand, the electrically conductive film 105 is electrically grounded, and hence displays the shielding effect against the electromagnetic noise, thus decreasing the electrical crosstalk.

The heat emanating from the optical device 102 or the electric circuit 103 is conducted to the silicon substrate via the electrically conductive film 105 formed on the flank surface of the connection section 104. The silicon substrate has high heat conductivity and hence allows for efficient heat removal.

Preferred exemplary embodiments will now be specifically described with reference to the drawings.

EXEMPLARY EMBODIMENT 1

An exemplary embodiment 1 will be explained in more detail with reference to the drawings.

Figure 2:
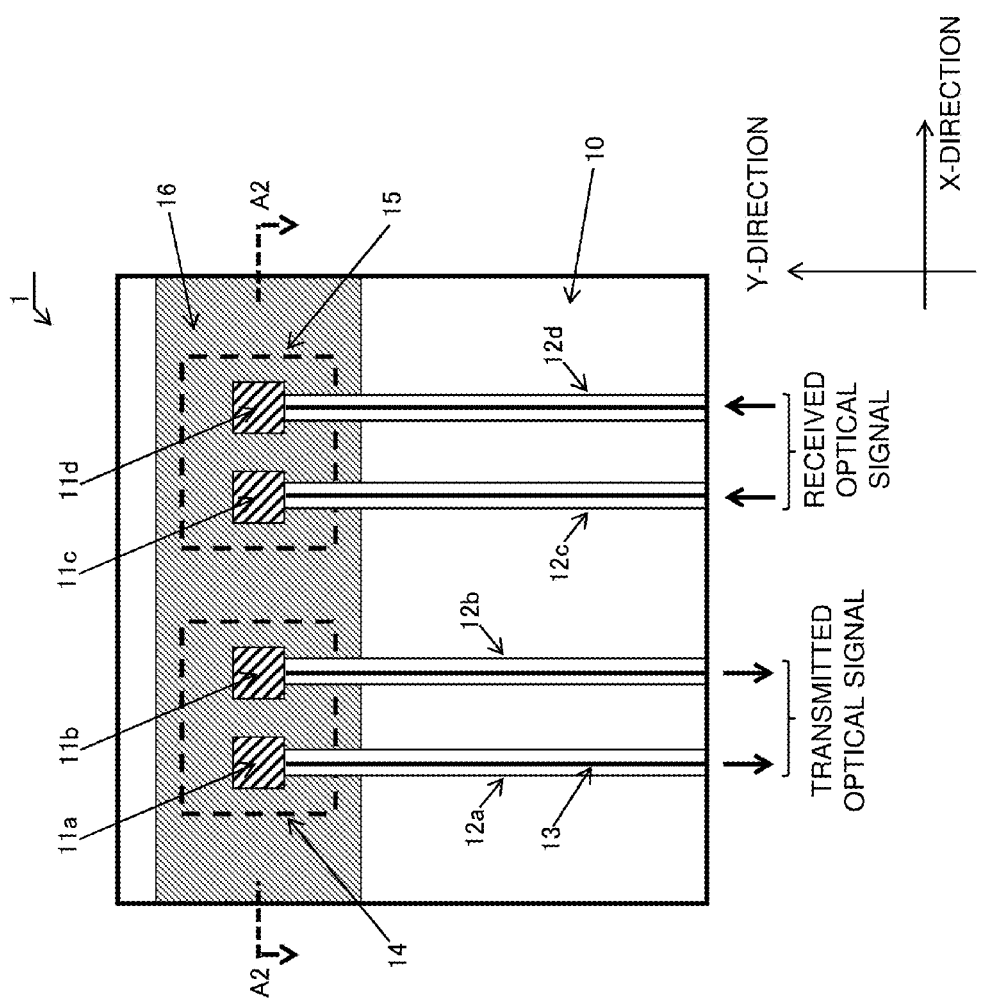
FIG. 2 is an example plan view showing an opto-electric integrated circuit according to an exemplary embodiment 1.

FIG. 2 shows an example plan view showing an opto-electric integrated circuit 1 according to the exemplary embodiment 1. Referring to FIG. 2, the opto-electric integrated circuit 1 is capable of transmitting/receiving two-channel signals, i.e., transmitting an optical signal to and receiving the signal from outside. The opto-electric integrated circuit 1 is paired to another opto-electric integrated circuit 1, not shown, to enable chip-to-chip transmission of optical signals.

The opto-electric integrated circuit 1 is of such a structure that four mesa structures 11a to 11d are provided on a supporting silicon substrate 10. Each of the mesa structures 11a to 11d represents a site of connection between optical devices (a modulator and a receiver) and electric devices (a driver chip and a TIA chip), and is formed to a mesa-shaped cross-section. In an inner portion of each of the mesa structures 11a and 11b, there is formed a modulator, not shown in FIG. 2. In an inner portion of each of the mesa structures 11c and 11d, there is formed a light receiver, also not shown in FIG. 2.

It should be noted that, when respective components are each expressed by a symbol composed of a combination of a numerical figure and an alphabetical letter, then each figure represents each component. If, for example there is no particular reason that distinction is to be made among the mesa components 11a to 11d, a global expression of a 'mesa structure 11' is used.

Four optical waveguides 12a to 12d, extending in the Y-direction of FIG. 2, are respectively connected to inner portions of the mesa structures 11a to 11d. Specifically, the optical waveguides 12a, 12b are respectively optically connected to the modulators provided in the inner portions of the mesa structures 11a, 11b, while the optical waveguides 12c, 12d are respectively optically connected to the modulators provided in the inner portions of the mesa structures 11c, 11d.

The optical waveguide 12 is of a ribbed structure and is formed by a lower clad part composed of a portion of an insulation layer formed on the supporting silicon substrate 10 and a core part composed of a portion of a silicon layer (semiconductor layer) formed on the insulation layer. That is, the cross-sectional shape of the optical waveguide 12 is convex and a convexed part (ribbed part) thereof is denoted in FIG. 2 by a reference numeral 13. However, it is not meant to restrict the cross-sectional shape to the shape of the optical waveguide shown and the optical waveguide may also be a channel-shaped waveguide having a rectangular cross-section.

In the exemplary embodiment 1, the opto-electric integrated circuit 1 having the four optical waveguides will be explained hereinbelow. However, it is not meant to restrict the number of the optical waveguides such that the number of the optical waveguides may optionally be selected depending on the number of signal channels being used.

A driver chip is mounted by flip chip packaging on top of the mesa structures 11a, 11b. Likewise, a TIA chip is mounted by flip chip packaging on top of the mesa structures 11c, 11d. In FIG. 2, a driver chip packaging area 14 is denoted by a broken line to indicate a position of packaging of the driver chip. Likewise, in FIG. 2, a TIA chip packaging area 15 is denoted by a broken line to indicate a position of packaging of the TIA chip.

An electrically conductive film 16 is formed on the flank surface of the mesa structure 11 and on near-by portions of the surface of the supporting silicon substrate 10.

Figure 3:
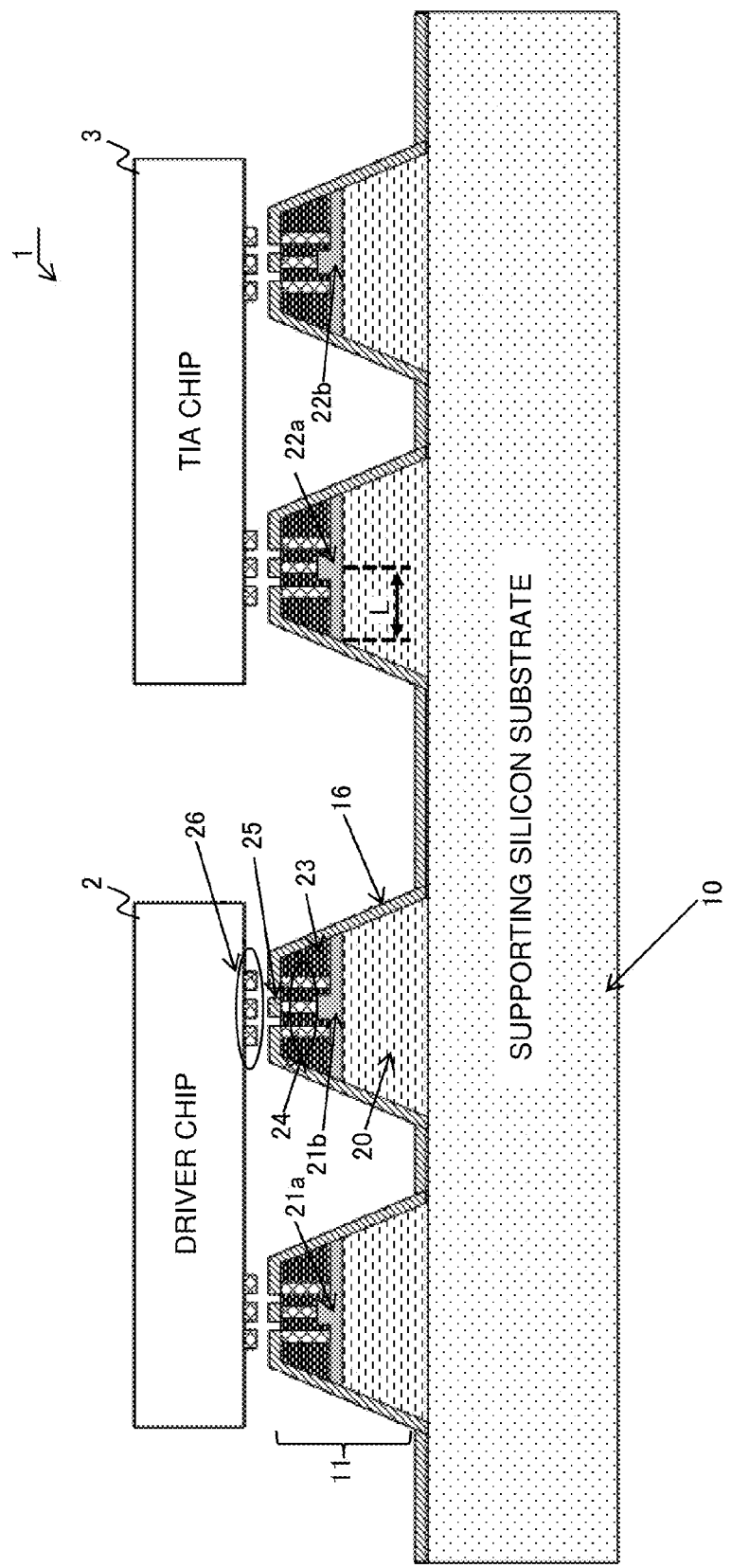
FIG. 3 is an example schematic cross-sectional view taken along line A2-A2 of FIG. 2.

FIG. 3 shows a schematic cross-sectional view taken along line A2-A2 of FIG. 2. Note that a driver chip 2 and a TIA chip 3, not shown in FIG. 2, are schematically shown in FIG. 3 in order to assist in understanding.

Referring to FIG. 3, modulators 21a, 21b are formed on top of an insulation layer 20 formed on the supporting silicon substrate 10. In similar manner, light receivers 22a, 22b are formed on top of the insulation layer 20. The modulator 21 is a waveguide type optical device optically connected to the optical waveguide 12, and the light receiver 22 is also a waveguide type optical device optically connected to the optical waveguide 12.

The modulators 21a, 21b and the light receivers 22a, 22b are provided in inner portions of the mesa structures 11a to 11d. The modulators 21a, 21b and the light receivers 22a, 22b are connected to a plurality of electrode pads 26 on the driver chip 2 side and on the TIA chip 3 side through a plurality of connection vias 24 formed in an insulation layer 23 in the inner portion of the mesa structure 11 and through a plurality of electrode pads 25.

The electrically conductive film 16 is formed around the mesa structure 11 inclusive of its flank surfaces. The electrically conductive film 16 is grounded by being electrically connected to one of the electrode pads 26 operating as a grounded terminal. That is, the electrically conductive film 16 is formed on an area of the silicon substrate 10 including at least the flank surface of the mesa-shaped connection section. It is also an electrically conductive member that is electrically grounded and that is in contact with the supporting silicon substrate 10.

Moreover, the optical waveguide 12 is a ribbed waveguide and hence is configured so that a slab part thereof contacts with the electrically conductive film 16 formed on the flank surface of the mesa structure 11, as shown in FIG. 3.

Although there is no particular limitation to the material of the electrically film 16, it is preferred to use a metal material which is low in electrical resistance while being high in thermal conductivity. For example, aluminum (Al) routinely used in a Si-CMOS (Silicon-Complementary Metal-Oxide Semiconductor) process is preferred. However, any other suitable metal material, such as copper (Cu), may also be used.

The opto-electric integrated circuit 1 may be manufactured subsequently as follows: Initially, the insulation layer 20 is formed on top of the supporting silicon substrate 10. Subsequently, silicon that will form the core of the optical waveguide is deposited or coated on the insulating layer 20, and is etched to form the ribbed waveguide. The insulation layer 23 formed of an insulation material, such as silicon oxide, is formed thereon. Instead of forming the layered structure by the above process, an SOI substrate having a buried oxide layer and an SOI layer from the outset may also be used. Etching is then performed to form the mesa structure 11. More specifically, an etching mask is formed at a preset position and dry or wet etching is then carried out. The electrically conductive film 16 is then formed in an area of the substrate including the flank surface of the mesa structure 11. It is by the above manufacturing process that the opto-electric integrated circuit 1 is produced.

The opto-electric integrated circuit 1 according to the exemplary embodiment 1 may be prepared from a SOI substrate. That is, the supporting silicon substrate 10, insulation layer 20 and the silicon layer (semiconductor layer) on the silicon layer 20 make up an SOI substrate, and a buried oxide layer of the SOI substrate is used as the insulation layer 20.

By the way, the insulation layer 23 of FIG. 3 operates as an upper clad of the optical waveguide 12.

In the exemplary embodiment 1, the mesa structure 11 is stated as being of a mesa or trapezoidal shape. However, it is not mandatory that the mesa structure is of a trapezoidal shape, as in FIG. 3, but may have a vertically extending or upstanding flank surface. However, from the perspective of reducing an optical crosstalk, the flank surface of the mesa structure 11 is desirably of an oblique profile, as will be shown subsequently. Also, from the perspective of the manufacturing process of forming the electrically conductive film 16 on the flank side of the mesa structure 11, the flank side is desirably of the oblique profile in order to enable the electrically conductive film to be formed more uniformly.

The optical as well as electrical crosstalk and the heat removal efficiency in the opto-electric integrated circuit 1 according to the exemplary embodiment 1 will now be verified.

In the opto-electric integrated circuit 1, the optical devices, namely the modulator 21 and the light receiver 22, are surrounded by the electrically conductive film 16, and hence the adverse effect of stray light from other optical devices, that is, the optical crosstalk, is lowered. Moreover, since the optical devices are built in the inner portion of the mesa structure 11, having an obliquely shaped flank surface, any stray light is reflected in the oblique direction, thus lowering the optical crosstalk.

Since the electrically conductive film 16 is electrically grounded, electromagnetic noises, otherwise produced due to the operation of the driving chip 2 or the TIA chip 3, are interrupted, thus reducing the electrical crosstalk in the inner portion of the mesa structure 11 covered with the electrically conductive film 16. Moreover, the electrically conductive film 16 contacts the supporting silicon substrate 10, and hence the electrical noises, mediated by the supporting silicon substrate 10, are interrupted, thus further reducing the electrical crosstalk.

The heat-removing efficiency of the opto-electric integrated circuit 1 will now be verified.

The heat generated by the optical devices, such as the modulator 21 or the light receiver 22, or by the electrical circuits, such as the driver chip 2 or the TIA chip 3, is conducted by the electrically conductive film 16 to the supporting silicon substrate 10 and removed. Hence, efficient heat removal may be achieved by providing for a sufficient contact area between the electrically conductive film 16 and the supporting silicon substrate 10. Additionally, since the slab part of the light waveguide and the electrically conductive film 16 on the flank surface of the mesa structure 11 contact each other, the thermal resistance is decreased, thus enabling efficient heat removal.

Modification

The opto-electric integrated circuit 1 of the exemplary embodiment 1 is merely illustrative and may be modified in various ways.

From the perspective of reducing the electrical crosstalk, it is desirable to restrict a length L between the modulator 21 or the light receiver 22 and the electrically conductive film 16 formed on the flank surface of the mesa structure 11 (see FIG. 3). Specifically, for a wavelength $\lambda$ corresponding to the frequency of the electrical signal handled by the electrical circuits (driver chip 2 and TIA chip 3), it is desirable that the relationship $L<\lambda/4$ holds.

Moreover, if doping is applied to an area of the supporting silicon substrate 10 contacting the electrically conductive film 16, the connection resistance is lowered, and hence the electrical crosstalk, mediated by the substrate, may be lowered more efficiently.

Additionally, by forming the electrically conductive film on the surfaces of the driver chip 2 and TIA chip 3 as well, it is possible to prevent stray light from falling from the optical devices into the electrical circuits to cause circuit malfunctions. Viz., it is desirable to form the electrically conductive film on the surfaces of the electrical circuits so as to prevent stray light from the optical devices from falling on the electrical circuits.

Furthermore, by forming a film formed of a material of a high light absorption coefficient on an inner side (a side contacting the flank surface of the mesa structure 11) of the electrically conductive film 16, it is possible to absorb stray light to reduce optical crosstalk. As the material of high light absorption coefficient, titanium (Ti), titanium nitride (TiN), tantalum (Ta) or tantalum nitride (TaN), for example, may be used, to provide for the function as barrier metal or a tight contacting layer. With a metal film having a light absorption coefficient higher than that of the electrically conductive film 16, it is possible to further reduce the optical crosstalk.

EXEMPLARY EMBODIMENT 2

An exemplary embodiment 2 will now be explained in detail with reference to the drawings.

Figure 4:
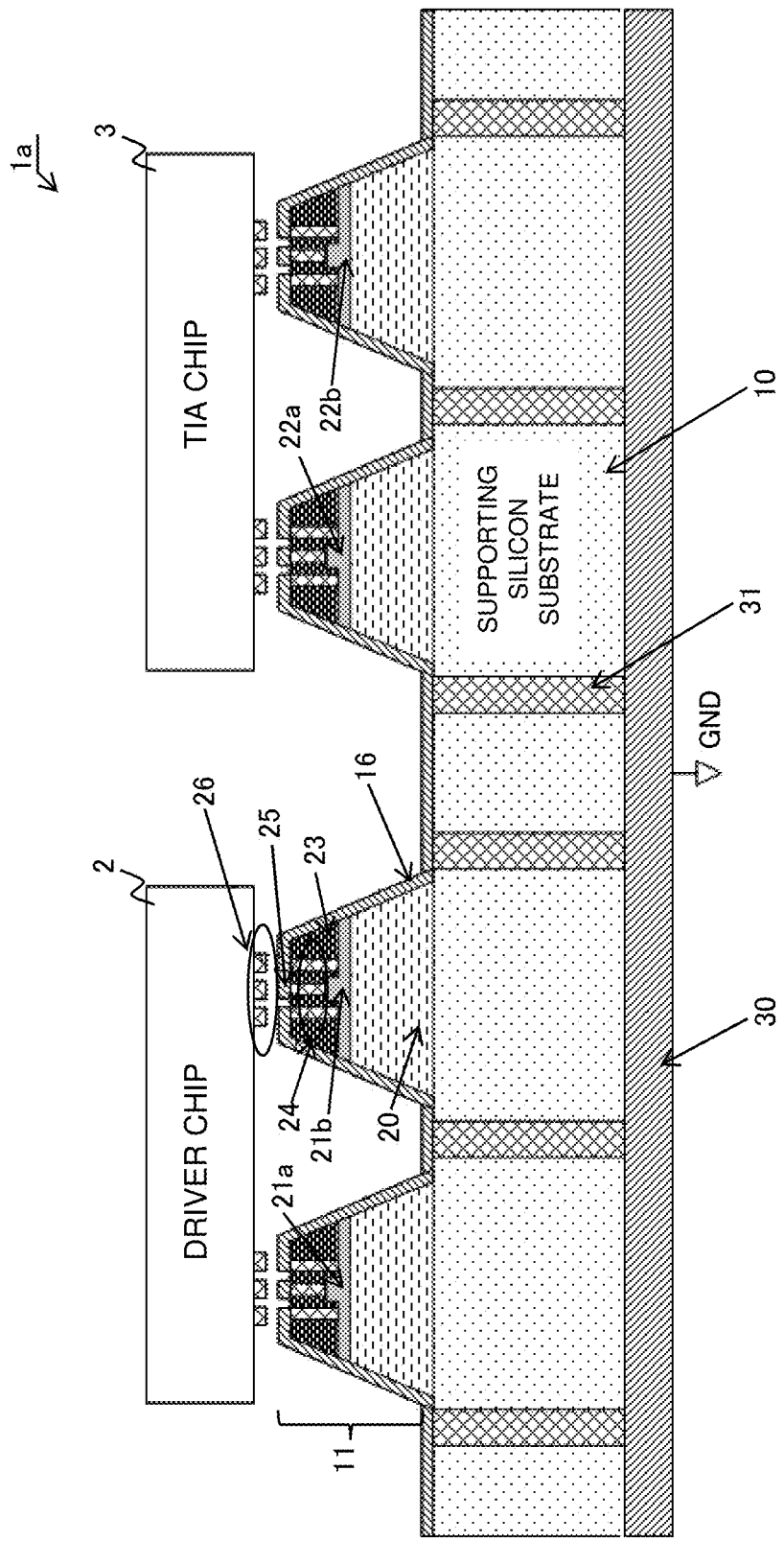
FIG. 4 is an example schematic cross-sectional view of an opto-electric integrated circuit according to an exemplary embodiment 2.

FIG. 4 shows an example schematic cross-sectional view of an opto-electric integrated circuit 1a according to the exemplary embodiment 2. In FIG. 4, the same parts or components as those of FIG. 3 are denoted by the same components and the corresponding description is dispensed with.

The opto-electric integrated circuit 1a differs from the opto-electric integrated circuit 1 in such points that the opto-electric integrated circuit, inclusive of the supporting silicon substrate, is mounted on a chip carrier 30, and that the chip carrier 30 is electrically connected to the electrically conductive film 16 by a plurality of through-substrate vias 31. The chip carrier 30 is grounded by being coupled to a ground (GND) potential.

Any heat generated by the optical devices (modulator 21 and light receiver 22) or the electrical circuits (driver chip 2 and TIA chip 3) is conducted to the chip carrier 30 by the through-substrate vias 31 formed in the supporting silicon substrate 10. The chip carrier 30 operates as a heat radiator, thus achieving efficient heat removal.

The chip carrier 30 is preferably formed of metal. It is desirable to use heat-radiating grease, capable of enhancing the heat removal efficiency, in combination, and to get the chip carrier mounted on a printed circuit board. Since the through-substrate vias 31 are formed in an inner portion of the supporting silicon substrate 10, electromagnetic noises may be shielded more efficiently, so that a higher electrical crosstalk reducing effect may be realized. Additionally, since it is only sufficient with the opto-electric integrated circuit 1a that the through-substrate vias 31 penetrate through the silicon layer, the manufacturing process may be facilitated in comparison with a structure in which the through-substrate vias penetrate through both an insulation layer and the silicon layer.

EXEMPLARY EMBODIMENT 3

An exemplary embodiment 3 will now be explained in detail with reference to the drawings.

Figure 5:
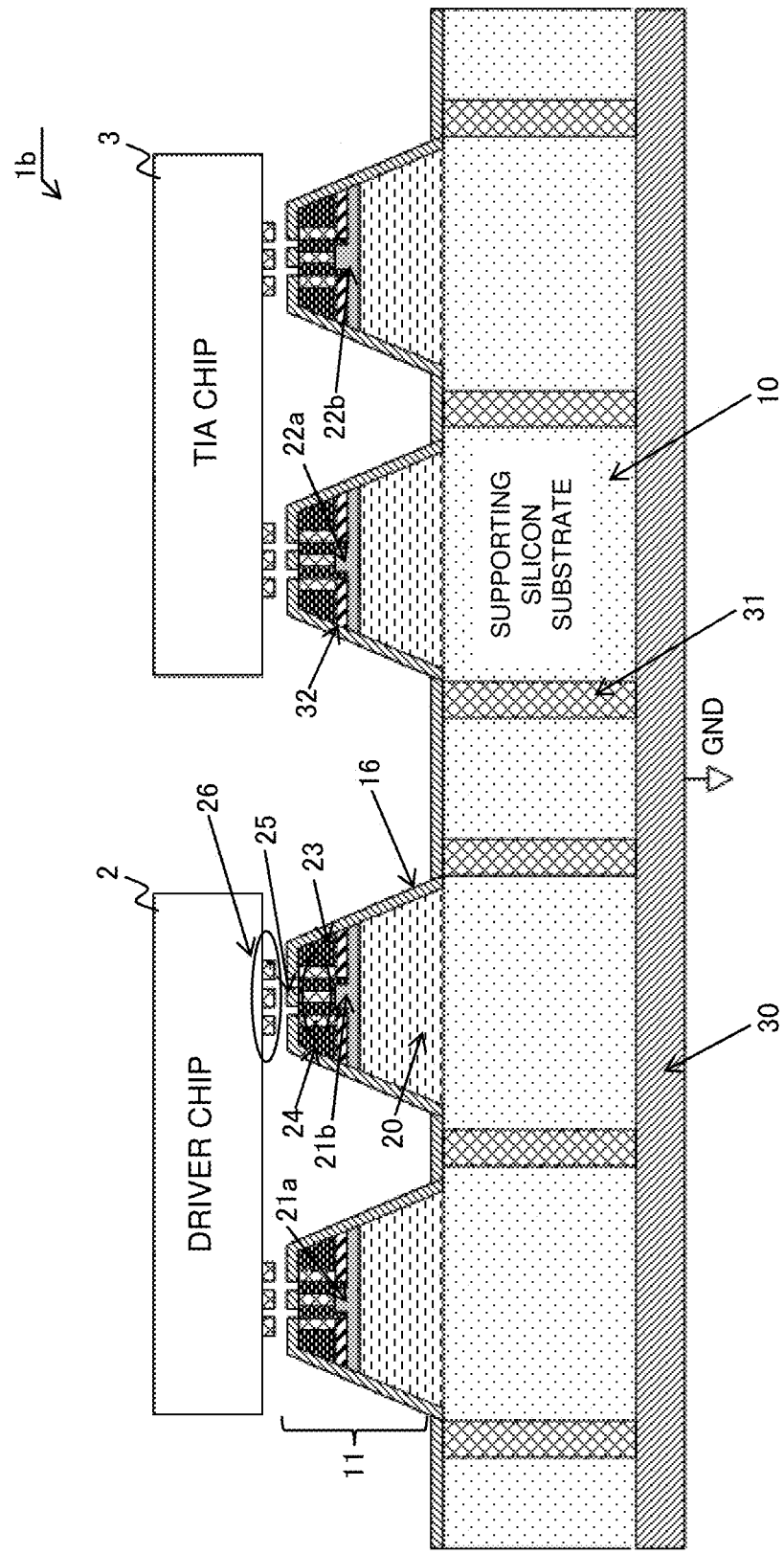
FIG. 5 is an example schematic cross-sectional view of an opto-electric integrated circuit according to an exemplary embodiment 3.

FIG. 5 shows an example schematic cross-sectional view of an opto-electric integrated circuit 1b according to the exemplary embodiment 3. In FIG. 5, the same parts or components as those of FIG. 4 are denoted by the same components and the corresponding description is dispensed with.

The opto-electric integrated circuit 1b according to the exemplary embodiment 3 includes, in contradistinction from the opto-electric integrated circuit 1a according to the exemplary embodiment 2, a heat-radiating electrically conductive member 32 between the modulator 21 and the light receiver 22 on one hand and the electrically conductive film 16 on the flank surface of the mesa structure 11 on the other hand.

Since the heat-radiating electrically conductive member 32 is now provided, the modulator 21 and the light receiver 22 are thermally coupled to the electrically conductive film 16, so that heat conduction may take place without the intermediary of the connection vias 24 in which there is a possibility of a higher thermal resistance. Hence, heat removal may be achieved more efficiently.

EXEMPLARY EMBODIMENT 4

An exemplary embodiment 4 will now be explained in detail with reference to the drawings.

Figure 6:
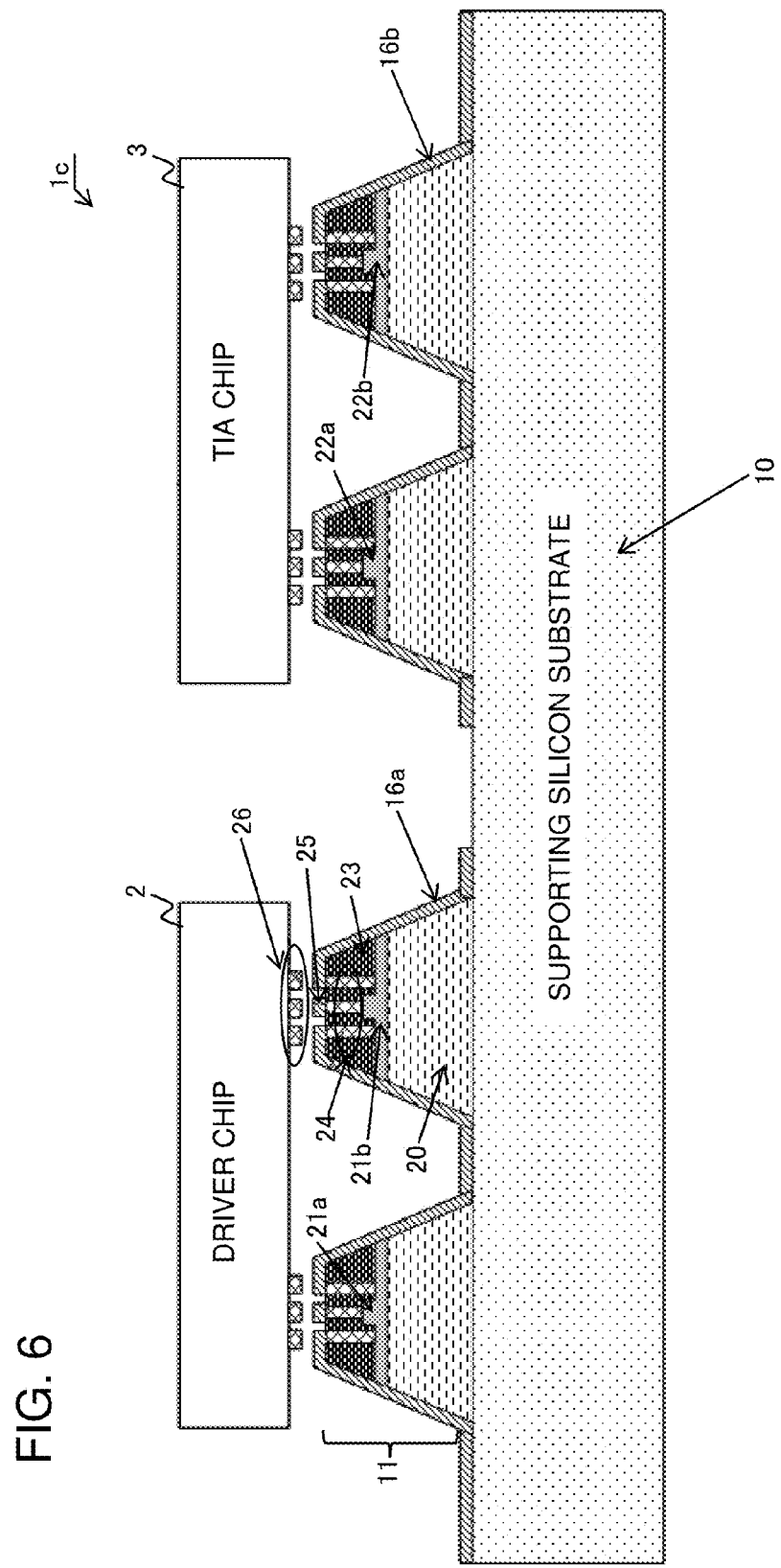
FIG. 6 is an example schematic cross-sectional view of an opto-electric integrated circuit according to an exemplary embodiment 4.

FIG. 6 shows an example schematic cross-sectional view of an opto-electric integrated circuit 1c according to the exemplary embodiment 4.

The opto-electric integrated circuit 1c differs from the opto-electric integrated circuit 1 in such respect that the electrically conductive film 16 is electrically separated into a modulator 21 side and a light receiver 22 side. More specifically, an electrically conductive film 16a, connected to the modulator 21 and to the grounding terminal (electrode pad) of the driver chip 2, is separated from an electrically conductive film 16b connected to the light receiver 22 and to a grounding terminal (electrode pad) of the TIA chip 3.

In this manner, in the opto-electric integrated circuit 1c, the optical devices and the electrical circuits on the transmitting side are grounded in common, and the optical devices and the electrical circuits on the receiving side are also grounded in common. In addition, the grounding on the transmitting side is electrically separated from that on the receiving side, thereby preventing noise turnaround via the grounding for further reducing the electrical crosstalk.

EXEMPLARY EMBODIMENT 5

An exemplary embodiment 5 will now be explained with reference to the drawings.

Figure 7:
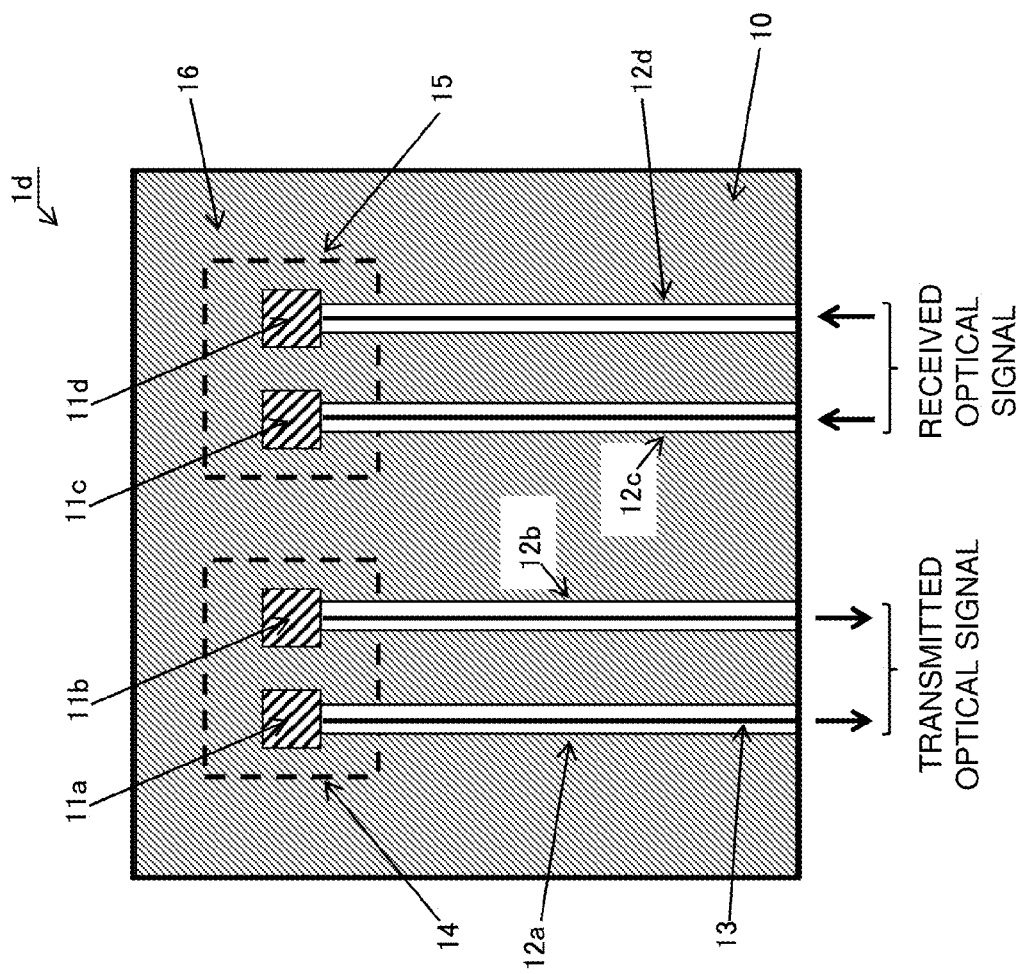
FIG. 7 is an example plan view showing an opto-electric integrated circuit according to an exemplary embodiment 5.

FIG. 7 depicts a plan view showing an example opto-electric integrated circuit 1d of the exemplary embodiment 5. In FIG. 7, the same components as those shown in FIG. 2 are indicated with the same symbols and the corresponding description is dispensed with.

In the opto-electric integrated circuit 1 according to the exemplary embodiment 1, only the portion of the circuit around the mesa structure 11 is covered with the electrically conductive film 16. On the other hand, in the opto-electric integrated circuit 1d according to the exemplary embodiment 5, about the entire surface of the supporting silicon substrate 10 is covered with the electrically conductive film 16.

With the major portion of the surface of the supporting silicon substrate 10 covered with the electrically conductive film 16, the contact surface of the two components is increased, thus lowering the thermal resistance, as a result of which heat may be removed more efficiency.

However, in FIG. 7, the electrically conductive film 16 is not provided around the optical waveguides 12 in order to reduce waveguide loss. It is however also possible to form the electrically conductive film 16 so as to surround the optical waveguides 12 with a view to reducing the optical crosstalk.

There may be cases where it is difficult to uniformly cover the entire surface of the supporting silicon substrate 10 with the electrically conductive film 16 due to the density constraint of the metal part during the manufacturing process for the opto-electric integrated circuit 1d or to the mechanical stress. In such case, the electrically conductive film 16 may be formed to a mesh shape. It is noted that, for achieving the electrical crosstalk reducing effect, the pitch of the mesh pattern is desirably not greater than about 4/λ where is the wavelength corresponding to the frequency of an electrical signal.

EXEMPLARY EMBODIMENT 6

An exemplary embodiment 6 will now be explained with reference to the drawings.

Figure 8:
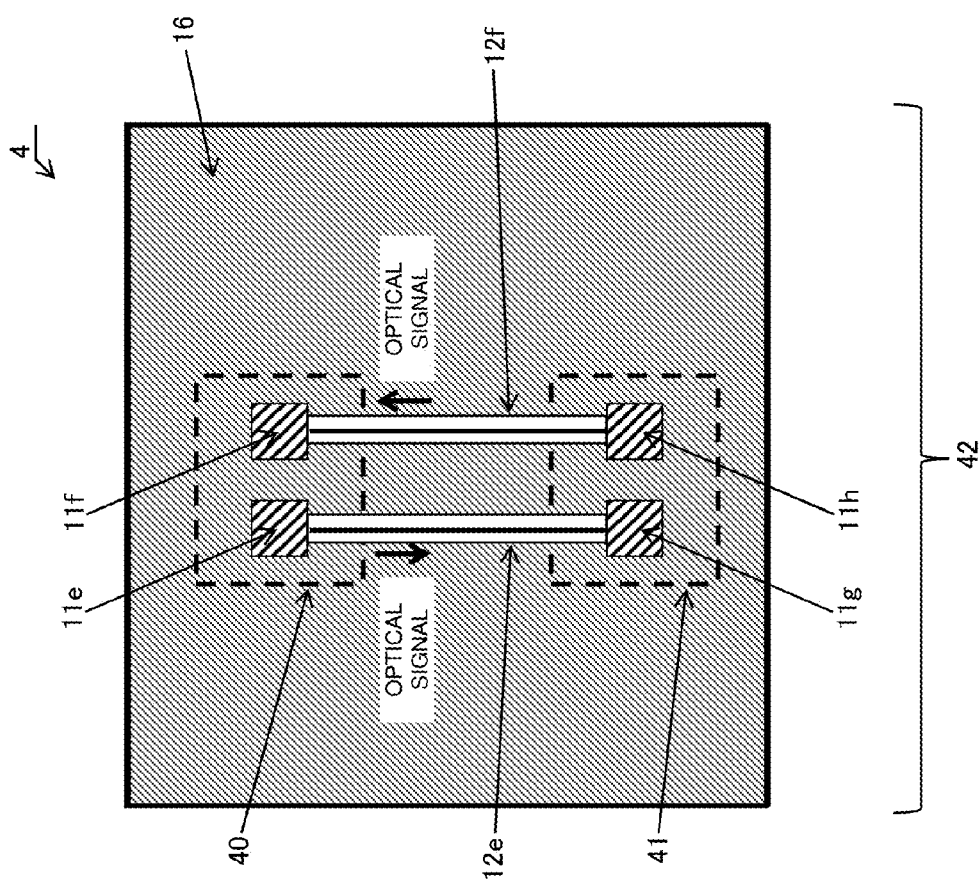
FIG. 8 is an example plan view showing an opto-electric integrated circuit according to an exemplary embodiment 6.

FIG. 8 depicts an example plan view showing an opto-electric integrated circuit 4 of the exemplary embodiment 6. Referring to FIG. 8, a plurality of semiconductor chips (IC chips) are packaged on the opto-electric integrated circuit 4. A transmitter section and a receiver section are mounted on one and the same silicon substrate.

More specifically, a semiconductor chip having a transmission function and another semiconductor chip having a reception function are respectively mounted in semiconductor chip packaging regions 40, 41 of the opto-electric integrated circuit 4.

Below the semiconductor chip packaging regions 40, 41, there are formed mesa structures 11e to 11h. These mesa structures possess the functions equivalent to those of the mesa structures stated in the exemplary embodiments 1 to 5 and make for reducing the optical as well as electrical crosstalk and heat removal. The respective semiconductor chips, mounted in the semiconductor chip packaging regions 40, 41, are optically interconnected by optical waveguides 12e, 12f. A silicon substrate, carrying the opto-electric integrated circuit 4, operates as an optical interposer 42 to enable optical transmission among a plurality of the semiconductor chips mounted on the optical interposer 42.

By the way, in FIG. 8, as in the exemplary embodiment 5, about the total surface of the silicon substrate is covered with the electrically conductive film 16, as a result of which the crosstalk among the semiconductor chips on the optical interposer 42 may be reduced to enhance the heat removal efficiency.

While the exemplary embodiments 1 to 6 are shown and described in detail, optional combinations of the exemplary embodiments may be made as further exemplary embodiments. For example, it is of course possible to add the heat-radiating electrically conductive member 32, explained in the exemplary embodiment 3, to the configuration of the opto-electric integrated circuit 1 (FIG. 3) explained in connection with the exemplary embodiment 1.

Part or all of the above exemplary embodiments may be stated as in the modes below, only in a non-restrictive meaning, that is, these modes are shown only as examples.

[Mode 1]

An opto-electric integrated circuit comprising:
an optical waveguide formed using a portion of an insulation layer on a silicon substrate to form a lower clad and using a portion of a semiconductor layer formed on the insulation layer to form a core;
an optical device connected to the optical waveguide;
an electrical circuit connected to the optical device;
a mesa-shaped connection section interconnecting the optical device and the electrical circuit; and
an electrically conductive film formed in a region at least containing a flank surface of the connection section; the electrically conductive film being grounded while contacting the silicon substrate.

[Mode 2]
The opto-electric integrated circuit according to mode 1, further comprising:
a through-substrate via penetrating through the silicon substrate;
the through-substrate via interconnecting a heat-radiating member contacting the silicon substrate and the electrically conductive film.

[Mode 3]
The opto-electric integrated circuit according to mode 1 or 2, wherein, a heat-radiating electrically conductive member is formed between the optical device and the flank surface of the connection section

[Mode 4]
The opto-electric integrated circuit according to any one of modes 1 to 3, wherein,
the electrically conductive film is formed so as to cover the surface of the silicon substrate.

[Mode 5]
The opto-electric integrated circuit according to any one of modes 1 to 4, wherein,
the electrically conductive film is formed so as to cover the surface of the silicon substrate in the form of a mesh.

[Mode 6]
The opto-electric integrated circuit according to any one of modes 1 to 5, wherein,
a distance L between the optical device and the portion of the electrically conductive film formed on the flank surface of the connection section and the wavelength corresponding to the frequency of an electrical signal handled by the electrical circuit satisfy the relationship: $L<\lambda/4$.

[Mode 7]
The opto-electric integrated circuit according to any one of modes 1 to 6, wherein,
a film formed of a metal having a light absorption coefficient higher than the light absorption coefficient of the electrically conductive film is formed on a side of the electrically conductive film contacting the flank surface of the connection section.

[Mode 8]
The opto-electric integrated circuit according to any one of modes 1 to 7, wherein,
a ground of the optical device and a ground of the electrical circuit on the transmission side are used in common as a first ground;
a ground of the optical device and a ground of the electrical circuit on the reception side are used in common as a second ground; and wherein, the first and second ground are electrically separated from each other.

[Mode 9]
The opto-electric integrated circuit according to any one of modes 1 to 8, wherein,
an electrically conductive film is formed on the surface of the electrical circuit so as to prevent stray light from the optical device from falling on the electrical circuit.

[Mode 10]
A optical interposer comprising:
a silicon substrate on which an opto-electric integrated circuit according to any one of modes 1 to 9 has been formed, and
a plurality of semiconductor chips formed on the silicon substrate; wherein,
an optical signal is transmitted among the semiconductor chips.

The disclosures of the above mentioned Patent Literatures as well as non-Patent Literatures are to be incorporated herein by reference. The exemplary embodiments or Examples may be modified or adjusted within the concept of the total disclosures of the present invention, inclusive of claims, based on the fundamental technical concept of the invention. A wide variety of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

What is claimed is:

1. An opto-electric integrated circuit, comprising:
an optical waveguide formed using a portion of an insulation layer on a silicon substrate to form a lower clad and using a portion of a semiconductor layer formed on the insulation layer to form a core;
an optical device connected to the optical waveguide, the optical device comprising a modulator or a receiver;
an electrical circuit connected to the optical device, the electrical circuit comprising a driver chip or a transimpedance amplifier chip;
a mesa-shaped connection section interconnecting the optical device and the electrical circuit; and
an electrically conductive film formed in a region at least containing a flank surface of the connection section, the electrically conductive film being grounded while contacting the silicon substrate.

2. The opto-electric integrated circuit according to claim 1, further comprising:
a through-substrate via penetrating through the silicon substrate;
the through-substrate via interconnecting a heat-radiating member contacting the silicon substrate and the electrically conductive film.

3. The opto-electric integrated circuit according to claim 1, wherein,
a heat-radiating electrically conductive member is formed between the optical device and the flank surface of the connection section.

4. The opto-electric integrated circuit according to claim 1, wherein,
the electrically conductive film is formed so as to cover the surface of the silicon substrate.

5. An opto-electric integrated circuit, comprising:
an optical waveguide formed using a portion of an insulation layer on a silicon substrate to form a lower clad and using a portion of a semiconductor layer formed on the insulation layer to form a core;
an optical device connected to the optical waveguide;
an electrical circuit connected to the optical device;
a mesa-shaped connection section interconnecting the optical device and the electrical circuit; and
an electrically conductive film formed in a region at least containing a flank surface of the connection section, the electrically conductive film being grounded while contacting the silicon substrate,
wherein the electrically conductive film is formed so as to cover the surface of the silicon substrate in the form of a mesh.

6. An opto-electric integrated circuit, comprising:
an optical waveguide formed using a portion of an insulation layer on a silicon substrate to form a lower clad and using a portion of a semiconductor layer formed on the insulation layer to form a core;

an optical device connected to the optical waveguide;

an electrical circuit connected to the optical device;

a mesa-shaped connection section interconnecting the optical device and the electrical circuit; and an electrically conductive film formed in a region at least containing a flank surface of the connection section, the electrically conductive film being grounded while contacting the silicon substrate, wherein a distance L between the optical device and the portion of the electrically conductive film formed on the flank surface of the connection section and the wavelength corresponding to the frequency of an electrical signal handled by the electrical circuit satisfy the relationship: $L<\lambda/4$.

7. The opto-electric integrated circuit according to claim 1, wherein, a film formed of a metal having a light absorption coefficient higher than a light absorption coefficient of the electrically conductive film is formed on a side of the electrically conductive film contacting the flank surface of the connection section.

8. The opto-electric integrated circuit according to claim 1, wherein, a ground of the optical device and a ground of the electrical circuit on the transmission side are used in common as a first ground;

a ground of the optical device and a ground of the electrical circuit on the reception side are used in common as a second ground; and wherein, the first and second ground are electrically separated from each other.

9. The opto-electric integrated circuit according to claim 1, wherein, an electrically conductive film is formed on the surface of the electrical circuit so as to prevent stray light from the optical device from falling on the electrical circuit.

10. An optical interposer, comprising:

a silicon substrate on which an opto-electric integrated circuit according to claim 1 has been formed, and a plurality of semiconductor chips formed on the silicon substrate; wherein, an optical signal is transmitted among the semiconductor chips.

* * * * *